J. W. MITCHELL & W. O. WALKER.
APPARATUS FOR DETERMINING THE AMOUNT OF MOISTURE IN CHEESE AND THE LIKE.
APPLICATION FILED MAR. 14, 1908.
920,773.
Patented May 4, 1909.
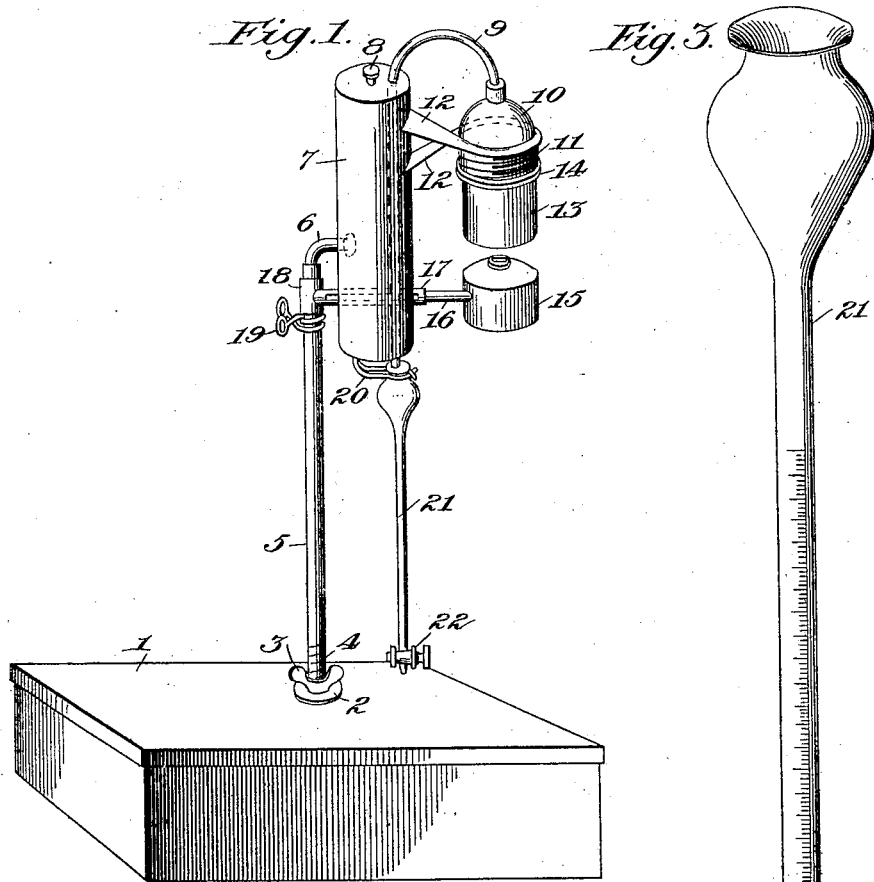

UNITED STATES PATENT OFFICE.

JOEL WALTER MITCHELL AND WILLIAM OSCAR WALKER, OF KINGSTON, ONTARIO, CANADA.

APPARATUS FOR DETERMINING THE AMOUNT OF MOISTURE IN CHEESE AND THE LIKE.

No. 920,773.  Specification of Letters Patent.  Patented May 4, 1909.

Application filed March 14, 1908. Serial No. 421,279.

*To all whom it may concern:*

Be it known that we, JOEL WALTER MITCHELL and WILLIAM OSCAR WALKER, subjects of the King of Great Britain, residing at the city of Kingston, in the Province of Ontario and Dominion of Canada, have invented certain new and useful Improvements in Apparatus for Determining the Amount of Moisture in Cheese and the Like; and we do declare the following to be a full, clear, and exact description of the invention, such as will enable others skilled in the art to which it appertains to make and use the same.

This invention relates to improved apparatus for evaporating, condensing, collecting and measuring the moisture contained in butter, cheese or any other substance.

In the accompanying drawings, Figure 1 is a perspective view of this improved apparatus set up ready for operation. Fig. 2 is a side elevation of the small receptacle for the cheese or butter to be tested, detached; and Fig. 3 is a view of the separate graduated glass tube or receptacle for the condensed moisture.

In the embodiment illustrated, a support is shown preferably in the form of a box 1, in which the various parts of the invention may be packed for storage or shipment. A small block or disk of metal 2 having a screw-threaded orifice therein, is fixed to the cover of this box, in any suitable manner and is adapted to receive the screw-threaded end of a light metal standard or post 5 designed to support the various parts of the apparatus. A thumb-screw 3, adapted to screw upon the threaded end 4 of the standard 5 serves to lock the standard in any position when it is set up. The standard is preferably hollow or bored to receive the bent end of a horizontal arm 6 to the end of which a metal cylinder 7 is fixed in a vertical position and adapted to be filled with cool water through a convenient opening 8. Fixed to this cylinder and passing vertically through it, with its lower end extending below the cylinder, is a tube 9 preferably made of block tin. The end of this tube above the cylinder is preferably curved and terminates in a dome 10 which is fixed to the cylinder 7 by brackets 12 and serves as a cover for a metal cup or receptacle 13. This cup 13 may be attached to the cover 10 in any suitable manner, friction, for instance, being sufficient to hold it in place, but it is preferably connected, as shown, the dome or cover 10 being screw-threaded on its lower end at 11 to receive a correspondingly screw-threaded end of the cup 13, a shoulder 14 on the cup providing a tight joint when the cup is screwed in place.

A spirit lamp 15 is preferably attached by an arm 16 telescopically connected with an arm 17 connected by a rotatable coupling 18 to the standard 5. This arm is adapted as shown in Fig. 1, to revolve horizontally around the standard into any desired position, and at the same time to be extended as far as necessary while it may also be raised or lowered on the standard to any desired height. It will be found that friction will generally suffice to hold the lamp in any position in which it may be placed, but a simple device 19, consisting of a double coil of stiff wire around the standard with free ends adapted to be easily pressed together so as to loosen the coil, will preferably serve as a rest for the lamp arm or bracket to hold it at any desired height.

Fixed to the bottom of the cylinder 7 are laterally spaced wire brackets 20 adapted to receive the neck of a graduated glass receptacle 21, (shown enlarged in Fig. 3) and at the lower end of which a stop-cock 22 is arranged to provide for the contents being readily drawn off. This receptacle is preferably so graduated that the figures arranged vertically on the scale will indicate the percentage weight of water found in a certain weight of butter, cheese or other substance placed in the receptacle 13 but other methods of graduating may be adopted. The box 1 is also adapted to hold a small and convenient pair of scales which may be set up on the cover of the box for the purpose of weighing the required quantity of butter or cheese.

The requisite quantity of material is first weighed and placed in the cup 13 and if desired a proper quantity of a suitable reagent, preferably insoluble in water, or nearly so, may be added to facilitate the process. The cup 13 is then screwed tightly into the cover 10, and the lamp 15 is lighted and adjusted in a proper position below the cup and moved as may be required to provide the desired temperature, the water cylinder or jacket 7 having first been filled with cold water, and the glass receptacle 21 placed in position beneath the end of the tube 9. The moisture in the cheese or butter then evaporates and passes through the tube 9, condensing in its passage through the portion of the tube in the water jacket 7 and accumulates in the receptacle 21. When the operation is completed, a reading of the scale on the tube 21 will indicate the percentage weight of evaporated water.

We are aware that other testing devices for ascertaining the amount of water in cheese or butter are in use, but we claim that our apparatus is essentially different being simple in construction, easy to manufacture, accurate of results, durable and readily cleaned.

What we claim as our invention, and desire to protect by Letters Patent, is:—

In an apparatus for testing the amount of water contained in butter, cheese or other substances, the combination of a supporting standard having a laterally extending arm, a water containing vessel mounted on said arm, a condensing tube passing through said vessel and projecting at opposite ends thereof, the upper end being curved downwardly, a dome-shaped member carried by the free end of said bent upper portion and communicating with said tube, a cylindrical receptacle for containing the substance to be tested detachably connected with said dome-shaped member in air tight relation thereto, a revoluble arm extending laterally from said standard and vertically adjustable thereon, a lamp having a laterally extending arm for telescopic engagement with said revoluble arm to provide for the adjustment of said lamp below said receptacle, a moisture collecting vessel supported below the lower end of said condensing tube and comprising a small graduated tube having a bulb-like upper end provided with a flared mouth and means for closing said flared mouth.

In testimony whereof we have hereunto set our hands in presence of two subscribing witnesses.

JOEL WALTER MITCHELL.
  WILLIAM OSCAR WALKER.

Witnesses:
  SYDENHAR C. McGILL,
  JOHN SHARP.